(12) United States Patent
Apiecionek et al.

(10) Patent No.: US 9,352,247 B2
(45) Date of Patent: May 31, 2016

(54) METHOD AND DEVICE FOR DISTILLING OR THICKENING FLUIDS

(71) Applicant: PLAZMATRONIKA NT Sp. z o.o., Wroclaw (PL)

(72) Inventors: Robert Apiecionek, Wroclaw (PL); Tomasz Cioska, Wroclaw (PL)

(73) Assignee: PLAZMATRONIKA NT SP. Z O.O., Wroclaw (PL)

( * ) Notice: Subject to any disclaimer, the term of this patent is extended or adjusted under 35 U.S.C. 154(b) by 288 days.

(21) Appl. No.: 13/768,533

(22) Filed: Feb. 15, 2013

(65) Prior Publication Data
US 2013/0206582 A1  Aug. 15, 2013

(30) Foreign Application Priority Data
Feb. 15, 2012  (PL) .......................................... 398120

(51) Int. Cl.
*B01D 1/22* (2006.01)
*C02F 1/04* (2006.01)
*C02F 1/30* (2006.01)
*B01D 3/00* (2006.01)
*B01D 1/00* (2006.01)
*B01D 19/00* (2006.01)
*H05B 6/80* (2006.01)

(52) U.S. Cl.
CPC .............. *B01D 3/008* (2013.01); *B01D 1/0017* (2013.01); *B01D 1/0029* (2013.01); *B01D 19/0089* (2013.01); *H05B 6/802* (2013.01); *B01D 1/22* (2013.01); *C02F 1/04* (2013.01); *C02F 1/30* (2013.01)

(58) Field of Classification Search
CPC .......... B01D 1/0029; B01D 1/22; C02F 1/04; C02F 1/30
USPC ............................... 159/32, 35; 202/152, 163
See application file for complete search history.

(56) References Cited

U.S. PATENT DOCUMENTS

| | | | | |
|---|---|---|---|---|
| 2,978,562 A * | 4/1961 | Fox | ................................ | 219/688 |
| 3,846,254 A * | 11/1974 | Sephton | ........................... | 203/11 |
| 4,310,738 A * | 1/1982 | Moretti et al. | ................. | 219/688 |
| 5,055,180 A * | 10/1991 | Klaila | ............................ | 208/402 |
| 5,711,857 A * | 1/1998 | Armstrong | ..................... | 202/235 |
| 6,232,587 B1 * | 5/2001 | Kurita et al. | ..................... | 219/682 |
| 7,332,057 B2 * | 2/2008 | Isom et al. | ..................... | 159/47.1 |
| 7,629,497 B2 * | 12/2009 | Pringle | ........................... | 585/241 |
| 7,767,169 B2 * | 8/2010 | Snyder et al. | .............. | 422/186.3 |
| 2004/0050503 A1 * | 3/2004 | Vallejo-Martinez | ..... | B01D 1/22 159/22 |
| 2011/0113824 A1 * | 5/2011 | Kerpicci | ......................... | 62/515 |

* cited by examiner

*Primary Examiner* — In Suk Bullock
*Assistant Examiner* — Jonathan Pilcher
(74) *Attorney, Agent, or Firm* — Roberts Mlotkowski Safran & Cole, P.C.

(57) ABSTRACT

A device (100) for distilling or thickening fluids, having a chamber (102), an electromagnetic radiation generator (104) and a waveguide (106) connecting the electromagnetic radiation generator (104) with the interior of the chamber (102). The device (100) has a channel (108) located below the end (110) of the waveguide (106), the channel being adapted for transporting the fluid. One end of the channel (108) is the inlet (112) and the other end of the channel (108) is the outlet (114) for the fluid, the channel being shaped so as to prolong the dwell time of the fluid in the chamber (102). A method for distilling or thickening fluids based on passing the fluid through a chamber (102) within which the fluid is affected by electromagnetic radiation generated by an electromagnetic radiation generator (104), and the fluid flows through the chamber within a channel (108) located below the end (110) of a waveguide (106) transmitting the electromagnetic radiation from the generator (104), the channel (108) being shaped so as to prolong the dwell time of the fluid within the chamber (102).

16 Claims, 2 Drawing Sheets

METHOD AND DEVICE FOR DISTILLING OR THICKENING FLUIDS

CROSS-REFERENCE TO RELATED APPLICATIONS

The present Application is a U.S. Utility patent application, which claims priority from Polish patent application P-398120, filed on Feb. 15, 2012, which is hereby incorporated by reference in its entirety into the present Application.

FIELD OF THE INVENTION

The present invention relates to the method and device for distilling or thickening fluids.

STATE OF THE ART

In known devices for distilling or thickening fluids the fluid is heated up with the use of various heaters by the heat being exchanged between the heater surface and the contact surface of the liquid. Evaporation of the liquid occurs at its surface. To improve the efficiency of this process one increases the area of the heat exchange between the heater and the liquid thus increasing the evaporation area.

For removing water molecules from gas, e.g., natural gas, one uses various sorbents, solid or liquid, for example glycols, that are regenerated after the absorption process. The regeneration process of liquid sorbents is based on the normal (atmospheric) distillation during which, among others, water vapor and hydrocarbons (in the case of natural gas) are distilled. The atmospheric distillation is used widely, however, in the case of the water vapor it does not meet all the regulations because the glycols create azeotropes and the maximum regeneration ratio reaches 96-97% by weight.

In methods and devices known for regenerating liquid sorbents the sorbent is heated up by contacting a heating element, in a form of, e.g., a metal tube heated by burning natural gas. The disadvantage of this heating method is that the sorbents are heated in a contact manner, leading to local overheating the sorbent and its decomposition, this in turn resulting in gradual deteriorating its sorption parameters in subsequent absorption and regeneration cycles.

SUMMARY

The goal of the present invention is to eliminate the disadvantages of known from the state of art of devices and methods for distilling and thermal thickening fluids, and in particular to increase the efficiency thereof.

In a first embodiment of the present invention a device for distilling or thickening fluids has a chamber, an electromagnetic radiation generator, and a waveguide connecting said electromagnetic radiation generator with the interior of said chamber. Moreover, the device has a channel located below the end of the waveguide. The channel is adapted for transporting fluid. One end of the channel is the inlet; the second end of the channel is the outlet for the fluid. The channel is shaped so as to prolong the dwell time of the fluid in the chamber.

In a second embodiment of the present invention, a method for distilling or thickening fluids is based on passing fluid through a chamber in which the fluid is treated with electromagnetic radiation generated by an electromagnetic radiation generator. The fluid flows through the chamber via a channel located below the end of a waveguide transmitting the electromagnetic radiation from the generator, the channel being shaped so as to prolong the dwell time of the fluid in the chamber.

Other features of the present invention are presented in dependent claims.

BRIEF DESCRIPTION OF THE DRAWING

The present invention may be fully explained by the following detailed description with reference to the accompanying drawings, in which.

DETAILED DESCRIPTION OF THE INVENTION

The present description shows embodiments of a device and a method for distilling or thickening fluids basing on the regeneration of liquid sorbents used in processes of refining natural gas. As it was said in the description of the related art, in these processes a sorbent captures various liquid and/or gaseous contaminants from natural gas and in this manner becomes consumed (contaminated), thus making it impossible for further usage. To regenerate such a contaminated sorbent one can use a method and a device described in embodiments of the present invention.

The processes of distilling and thickening flow in the same manner and use the same device in embodiments of the present invention. The goals of these processes are different. In the case of the thickening process, one removes (evaporates) a solvent, while in the case of the distillation process one removes contaminants.

However, it should be emphasized that the embodiments presented below in no way limit the scope of the patent protection and they merely illustrate one of many possible applications of the present invention. The present invention may be employed in all the cases, in which water or another polar liquid is a contaminant of another fluid, and also everywhere where one needs to thicken a fluid by evaporating the liquid, e.g. water, from it.

Figure 1:
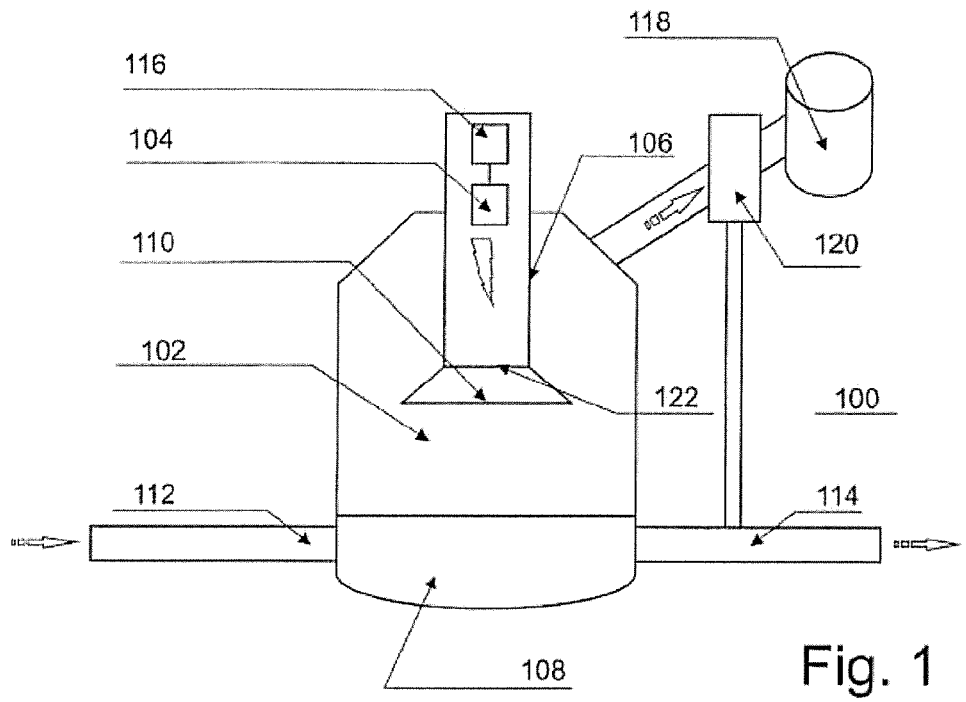
FIG. 1 shows schematically a device for distilling fluids in one embodiment of the present invention.

FIG. 1 shows a fluid distillation device 100. The device may be applied, among others, to regenerate liquid sorbents dedicated to removing contaminants from natural gas. Exemplary liquid sorbents used in gas industry are glycols. However, as mentioned above, the device and method described in embodiments of the present invention are not limited to the gas industry or glycols. Other examples of liquid sorbents include: amines used for desulfurization of gases, solutions of lithium chloride, anhydrous or concentrated (98-96%) sulfuric acid $H_2SO_4$.

The operation principle of the device according to the present invention is based on heating a polar fluid by electromagnetic radiation. A polar fluid is a liquid the molecules of which have nonuniformly distributed valence electrons and unbalanced electronegativity of atoms creating the molecules. A very good example of a polar fluid is water, which results from the fact that the principle according to which the oxygen atom binds with the two hydrogen atoms produces "a surplus" of electrons on the oxygen atom side and "a deficiency" of electrons (or "a surplus" of protons) on the hydrogen atom side. This asymmetry of electron distribution within a water molecule makes it a dipole and water to be a polar liquid.

Not going into details of the processes on the molecular level which are well known to the experts in that field, it is well known that electromagnetic radiation in some ranges of frequency is absorbed by a polar liquid, this in turn increasing its temperature. This phenomenon is employed by, e.g., microwave heaters. Microwave heaters, e.g., microwave ovens, work with electromagnetic radiation of a frequency about 2.45 GHz. The radiation of such a frequency is well absorbed by water, the main component of food, and as an effect heats the contained water up. However, the phenomenon of heating a polar liquid up by electromagnetic radiation is not limited to microwaves of the 2.45 GHz frequency. This effect may be utilized, to different extent depending on the liquid type, at frequencies from the infrared to RF range. Although it is possible to use electromagnetic radiation in a wide spectral range, some limitations are imposed by e.g., legal regulations governing the allocation of the spectrum for different purposes. This is to eliminate the interferences or at least to reduce them.

As a result, in a preferred embodiment, a fluid distillation device according to the present invention works with a generator emitting radiation of the frequency of 2.45 GHz. In alternative embodiments the frequency may be in any ISM (Industrial Scientific Medical) band accepted for the free use. According to the decree of the Polish Ministry of Communications of 3 Jul. 2007, DzU No 132, item 972, the ISM frequency bands accepted on the territory of Poland are: 6.765 MHz-6.795 MHz; 13.553 MHz-13.567 MHz; 26.957 MHz-27.283 MHz; 40.66 MHz-40.70 MHz; 2 400 MHz-2 483 MHz; 5 725 MHz-5 875 MHz; 24 000 MHz-24 250 MHz; 61.00 GHz-61.50 GHz; 122.00 GHz-123.00 GHz; 244.00 GHz-246.00 GHz. The above values are merely examples and in no way are intended to limit the protection of the present invention, and their only aim is to illustrate the possibility of using radiation of different frequency. Depending on the dedicated purpose of the device according to the present invention, it may work with different frequencies, depending on the relevant national regulations.

FIG. 1 shows a preferred embodiment of a device 100 for distilling fluids, for example liquid sorbents, according to the present invention. The device 100 has a chamber 102 in which the flowing fluid (e.g., a sorbent) is heated up. In the embodiment illustrated in FIG. 1 the device has an electromagnetic radiation generator 104 located centrally in the upper portion of the chamber. The generator may be located within the chamber or outside the chamber. Locating the electromagnetic radiation generator 104 outside the chamber 102 is advantageous since it gives an easier access to the generator 104 when maintenance operations are necessary. Similarly, the central position of the generator in the upper portion of the chamber 102 is a preferred but not the only embodiment. In alternative embodiments the generator is not centrally situated and the electromagnetic radiation is delivered to the desired place within the chamber 102 by means of a suitably shaped waveguide 106. To minimize electromagnetic radiation losses it is preferred to use a straight waveguide 106 (as in FIG. 1), connecting the electromagnetic radiation generator 104 with the interior of the chamber 102. The waveguide delivers the electromagnetic radiation into the chamber 102 and prevents its dissipation. The designs of the generator 104 and the waveguide 106 are known in the art and will not be further discussed here.

The device 100 has a channel 108 located below the end 110 of the waveguide 106 adapted for transporting a liquid sorbent (or another fluid) through the chamber during the regeneration process. One end of the channel 108 is an inlet 112 and the other end of the channel 108 is an outlet 114 for the sorbent. The channel 106 is shaped so as to prolong the dwell time of the sorbent within the chamber 102.

Preferably, the end of the waveguide 106 is closed by a plate/baffle 122 made from a material not absorbing the electromagnetic radiation in the frequency range emitted by the generator 104. In the embodiment illustrated in FIG. 1 the waveguide 106 is ended with a collar 110 in which a quartz glass window is located. Other materials from which the plate/baffle 122 can be made include; but not exclusively, polytetrafluoroethylene or normal glass. The collar conical shape as in FIG. 1 is not mandatory and other shapes of the end 110 are possible, e.g. cylindrical.

The plate/baffle 122 closing the waveguide 106 prevents the vapors from entering the magnetron in the electromagnetic radiation generator 104. Quartz glass is particularly good for this task since it is resistant to very high temperature. Quartz glass was tested by the Inventors at temperatures up to 2000° C. An additional advantage of the quartz glass, making it particularly good for closing the waveguide 106, is its very good transmittance (low absorption) to electromagnetic radiation.

The fluid flowing into the channel 108 is treated with the electromagnetic radiation by means of which its temperature increases. In the case of the flow-through heating the difference between the liquid temperature at the outlet and the inlet depends, among others, on how long the electromagnetic radiation acts on the flowing liquid (sorbent). Besides, the electromagnetic radiation is present in the region confined by the walls of the chamber 102. To utilize the electromagnetic radiation as efficiently as possible, the Inventors of the present solution designed the channel 108 within which the liquid (liquid sorbent) flows around the entire surface limited by the walls of the chamber, the channel 108 being a double spiral, and the inlet portion of the channel 108 contacting the outlet portion of the channel 108 at the center 202 of this spiral, as shown in FIG. 2.

Figure 2:
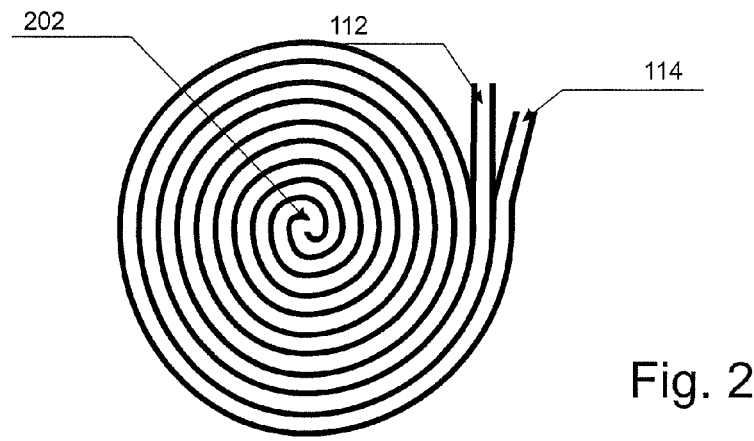
FIG. 2 shows a plan view of a channel employed in one embodiment of the present invention, in which a double spiral has a circular contour.

In a preferred embodiment shown in FIG. 2, the channel has the form of a Fermat's spiral. When the chamber 102 has a circular cross-section, the channel in the form of a Fermat's spiral fills the chamber basis completely and thus the whole radiation beam affects the liquid flowing within the channel 108. The channel wall has some negative effect on the efficiency of the heating process (there is no liquid in the region where the wall is situated). However, in preferred embodiments, this negative influence may be minimized by making the channel walls possibly thin or making the channel from a material absorbing the electromagnetic radiation generated by the generator 104. Making the channel from a material absorbing the electromagnetic radiation generated by the generator 104 is additionally advantageous, because it makes it possible to heat up non-polar liquids. This alternative embodiment allows for widespread usage of the present invention, not only for regenerating liquid sorbents in the gas industry, but also for distilling or thickening fluids in other fields of the chemical industry, food industry, building industry, or automotive industry.

Figure 5:
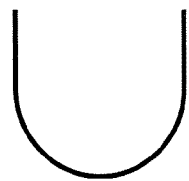
FIG. 5 shows a channel of FIGS. 2-4 having a U-shaped cross-section.
Figure 6:
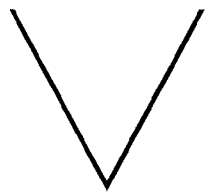
FIG. 6 shows a channel of FIGS. 2-4 having a V-shaped cross-section.

In a preferred embodiment, the channel 108 is open and has an arbitrary cross-section, for example U-shaped (FIG. 5) or V-shaped (FIG. 6). There are also alternative cross-sections of such an open channel that may be applied as well.

Additionally, the double spiral form of the channel 108 prolongs the dwell time of the fluid in the region where the electromagnetic radiation affects it. The fluid moves along the spiral towards the channel center 202, and then it flows into the outlet portion of the channel 108 and travels over the same path towards the outlet.

Figure 3:
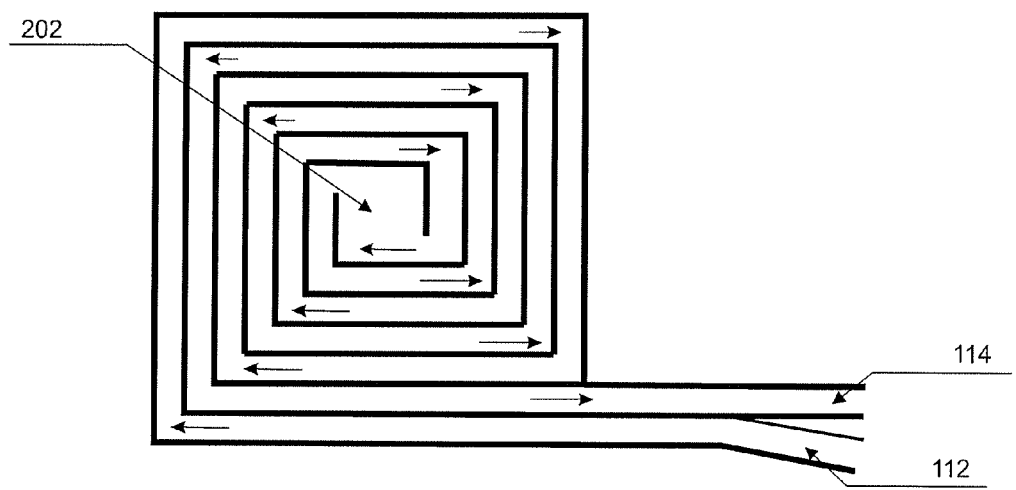
FIG. 3 shows a plan view of a channel employed in one embodiment of the present invention, in which a double spiral has a rectangular contour.
Figure 4:
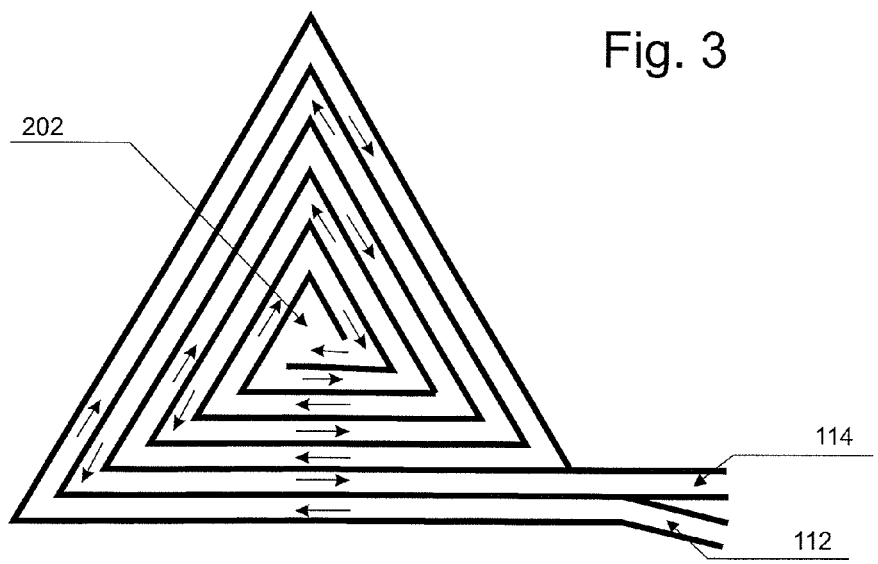
FIG. 4 shows a plan view of a channel employed in one embodiment of the present invention, in which a double spiral has a triangular contour.

As mentioned above, the Fermat's spiral is a preferred embodiment of the channel 108. However, there are alternative embodiments, in which the double "spiral" has a contour different than circular, for example rectangular (FIG. 3), triangular (FIG. 4), etc.

In a preferred embodiment, the center 202 of the channel 108 is located in the axis of the waveguide 106. This orientation increases the device efficiency because of the symmetrical distribution of the electromagnetic radiation. Moreover, when investigating the distribution of the electromagnetic field originated from the waveguide 106 radiation, the Inventors have noticed that the maximum impact of the electromagnetic field occurs centrally before the waveguide outlet in its axis. This observation is unexpected, since according to the electromagnetic field theory and many theoreticians' reports, the maximum field should be at the waveguide walls, while at the center it should be practically zero. In reality, however, the electromagnetic field influence giving the heating effect at the walls of the chamber 102 (which is assumed by the above mentioned theoreticians to be like an extension of the waveguide) is almost absent. With the configuration as in the embodiment illustrated in FIG. 1 one obtains a surprising effect of having the maximum electromagnetic field just below the waveguide outlet and in its axis, which, by employing the channel 108 as shown in embodiments of FIGS. 2-4, especially FIG. 2, allows for a significant improvement of the device efficiency.

In a preferred embodiment, the device 100 has a system 118 for controlling the pressure inside the chamber. As known, while decreasing the pressure one decreases the boiling point of a liquid, this in turn allowing for the evaporation of the contaminants from the sorbent at a lower temperature. This is particularly important if the sorbent is not stable at higher temperatures. Also, this can be utilized in the processes of thickening by evaporation (then the contaminant is a solvent to be removed). On the other hand, increasing the pressure increases the boiling point, which means that one can heat the liquid to a higher temperature than the atmospheric pressure. For controlling the pressure inside the chamber one can use a vacuum pump or ventilators, or another solution known in the art.

In a particularly preferred embodiment, the waveguide 106 is closed by quartz glass, and, additionally, a ventilator or another device is installed for evacuating vapors from the chamber. In this way a blow is created that blows the vapor which is evacuated outside the chamber 102 by means of a ventilating hood. Thus, deposition of the vapors on the quartz glass plate is eliminated or at least significantly reduced.

Preferably, the device 100 has also a separator 120 that separates the evaporated fractions such that the cleaned fluid is returned to the system. In the embodiment related to the regeneration of a liquid sorbent, e.g., glycol, also some minor evaporation of the glycol occurs in the chamber 102. The so evaporated sorbent is separated in the separator 120 and directed again to the circulation system as a cleaned sorbent. In one embodiment the outlet from the separator 120 is connected to the discharge channel 114. For simplicity only one outlet from the separator 120 has been shown in FIG. 1. However, alternative embodiments may have a bigger number of outlets evacuating different evaporated fractions, or just merely one outlet connected to the discharge channel 114 and a second outlet for discharging evaporated contaminants (without separating them into fractions).

The flow rate of the fluid in the channel 108 is controlled by a valve at the chamber inlet. In an alternative embodiment, the flow rate is controlled by the difference between the levels at which the inlet and outlet ports are situated.

Preferably, the device 100 has an electromagnetic radiation power control system 116 for controlling the power of the electromagnetic radiation emitted by the generator 104.

Due to applying the microwave flow through heating technique, the device for distilling or thickening fluids in the embodiments of the present invention heats the regenerated sorbent by volume. The whole volume of the regenerated sorbent is heated simultaneously, thus allowing for faster heating the contaminants and accelerating the evaporation thereof. It should be emphasized here that when applied for the regeneration of the sorbents used for refining natural gas, the microwave heating allows for breaking azeotropic bonds, by means of which high glycol concentrations, above 99% by weight, can be obtained as laboratory tests have confirmed. The additional advantage of the present solution is that in the case of a liquid sorbent, being a non-polar liquid, water may be distilled off (or other contaminants which are polar liquids), since the electromagnetic radiation (microwaves) affecting the water molecules but not the sorbent molecules increases the temperature of the water evaporating it, without the necessity of heating up the sorbent itself. Thanks to that, one can remove water from sorbents, the life-span of which is decreased by heating in known devices and according to methods known in the states of art, where the high temperature directly affects the sorbent.

The invention claimed is:

1. A device for thickening fluids comprising:

a chamber;

an electromagnetic radiation generator for heating the fluid to evaporate contaminants; and a waveguide connecting the electromagnetic radiation generator with an interior of the chamber, wherein the device has an open channel located below an end of the waveguide, the open channel being adapted for transporting a fluid, one end of the open channel being an inlet and the other end of the open channel being an outlet for the fluid, and the open channel being shaped as a Fermat's spiral so as to prolong the dwell time of the fluid in the chamber, in which the inlet portion of the open channel connects with the outlet portion of the open channel at a center of the spiral.

2. The device according to claim 1 wherein the waveguide has a circular cross-section.

3. The device according to claim 1 wherein the open channel is made from a material absorbing electromagnetic radiation emitted by the generator.

4. The device according to claim 1 further comprising a system for controlling the pressure within the chamber.

5. The device according to claim 1 further comprising an electromagnetic radiation power control system for controlling the power of the electromagnetic radiation emitted by the generator.

6. The device according to claim 1 wherein the open channel has a U shaped or V shaped cross section.

7. The device according to claim 1 wherein the center of the spiral of the open channel is located in the axis of the waveguide.

8. The device according to claim 1 wherein the spiral has a triangular contour.

9. The device according to claim 1 wherein the spiral has a rectangular contour.

10. The device according to claim 1 wherein the fluid is a liquid sorbent contaminated in a process of removing contaminants from natural gas.

11. The device according to claim 1 wherein the end of the waveguide is closed with a baffle made from a material transmitting electromagnetic radiation.

12. The device according to claim 11, wherein the material transmitting electromagnetic radiation is quartz glass.

13. The device according to claim 1 further comprising a separator connected to the chamber, adapted for separating condensate of the fluid from evaporated contaminants, the separator having an outlet connected to an outlet from the chamber.

14. A method for thickening fluids comprising:
passing a fluid through a chamber; and
heating the fluid with electromagnetic radiation generated by an electromagnetic radiation generator to evaporate contaminants from the fluid,
wherein the fluid flows through the chamber within an open channel located below an end of a waveguide transmitting the electromagnetic radiation from the generator, the open channel being shaped as a Fermat's spiral, so as to prolong the dwell time of the fluid within the chamber, in which an inlet portion of the open channel contacts an outlet portion of the open channel in a center of said spiral.

15. The method according to claim 14 further comprising a step of controlling the pressure within the chamber.

16. The method according to claim 14 wherein the thickening is carried out in order to regenerate a liquid sorbent contaminated in the process of removing contaminants from natural gas.

* * * * *